United States Patent
Inoue et al.

(10) Patent No.: US 12,371,217 B2
(45) Date of Patent: Jul. 29, 2025

(54) HEAT-SHRINKABLE POLYESTER FILM

(71) Applicant: TOYOBO CO., LTD., Osaka (JP)

(72) Inventors: Masafumi Inoue, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 417 days.

(21) Appl. No.: 17/629,484

(22) PCT Filed: Jul. 17, 2020

(86) PCT No.: PCT/JP2020/027820
§ 371 (c)(1),
(2) Date: Jan. 24, 2022

(87) PCT Pub. No.: WO2021/020167
PCT Pub. Date: Feb. 4, 2021

(65) Prior Publication Data
US 2022/0274731 A1 Sep. 1, 2022

(30) Foreign Application Priority Data
Jul. 26, 2019 (JP) ................................ 2019-137769

(51) Int. Cl.
*B65C 3/08* (2006.01)
*B29B 13/02* (2006.01)
*B29K 67/00* (2006.01)
*B29L 7/00* (2006.01)
*B65D 25/20* (2006.01)
*C08G 63/16* (2006.01)
*C08G 63/183* (2006.01)
*C08J 5/18* (2006.01)
*G09F 3/04* (2006.01)

(52) U.S. Cl.
CPC ............ *B65C 3/08* (2013.01); *B29B 13/023* (2013.01); *C08J 5/18* (2013.01); *B29K 2067/003* (2013.01); *B29K 2995/0049* (2013.01); *B29L 2007/008* (2013.01); *B65D 25/205* (2013.01); *C08G 63/16* (2013.01); *C08G 63/183* (2013.01); *C08J 2367/02* (2013.01); *C08J 2367/03* (2013.01); *G09F 3/04* (2013.01)

(58) Field of Classification Search
None
See application file for complete search history.

(56) References Cited

U.S. PATENT DOCUMENTS

| | | | | |
|---|---|---|---|---|
| 4,939,232 A | * | 7/1990 | Fukuda | B29C 55/005 528/304 |
| 4,996,291 A | * | 2/1991 | Yoshinaka | C08J 5/18 528/308.1 |
| 5,070,180 A | * | 12/1991 | Fukuda | C08J 5/18 528/298 |
| 6,663,929 B1 | * | 12/2003 | Tabota | B29B 17/02 428/903.3 |
| 2003/0088033 A1 | * | 5/2003 | Shelby | B29C 61/003 525/444 |
| 2003/0165671 A1 | * | 9/2003 | Hashimoto | C08J 5/18 428/304.4 |
| 2016/0347920 A1 | * | 12/2016 | Inoue | B29C 61/003 |
| 2018/0208375 A1 | | 7/2018 | Haruta et al. | |
| 2019/0161589 A1 | * | 5/2019 | Chang | C08G 63/672 |
| 2019/0169386 A1 | * | 6/2019 | Inoue | C08L 67/02 |
| 2019/0375552 A1 | | 12/2019 | Haruta et al. | |
| 2021/0016913 A1 | * | 1/2021 | Haruta | C08J 5/18 |
| 2023/0039563 A1 | * | 2/2023 | Liu | B29C 55/04 |
| 2023/0151146 A1 | * | 5/2023 | Haruta | C08G 63/183 525/444 |

FOREIGN PATENT DOCUMENTS

| | | |
|---|---|---|
| CN | 109563284 A | 4/2019 |
| JP | H10-279707 A | 10/1998 |
| JP | 2004-142126 A | 5/2004 |
| JP | 2004-345298 A | 12/2004 |
| JP | 2007-056156 A | 3/2007 |
| JP | 2019-107854 A | 7/2019 |
| WO | WO 2017/018345 A * | 2/2017 |
| WO | WO 2018/021212 A * | 2/2018 |

(Continued)

OTHER PUBLICATIONS

Indonesian Directorate General of Intellectual Property, Office Action in Indonesian Patent Application No. P00202200938 (Sep. 11, 2023).
Japanese Patent Office, International Search Report in International Patent Application No. PCT/JP2020/027820 (Sep. 24, 2020).
Intellectual Property India, Examination Report in Indian Patent Application No. 202247005151 (Dec. 12, 2023).
European Patent Office, Extended European Search Report in European Patent Application 20847515.2 (Jul. 11, 2023).
China National Intellectual Property Administration, First Office Action in Chinese Patent Application 202080053363.5 (Apr. 20, 2023).

(Continued)

*Primary Examiner* — Vivian Chen
(74) *Attorney, Agent, or Firm* — Leydig, Voit & Mayer, Ltd.

(57) ABSTRACT

A heat-shrinkable polyester film that has (1) a hot-water heat shrinkage of 40% or more in a main shrinkage direction of the film when immersed in hot water of 98° C. for 10 seconds; (2) a planar orientation coefficient of 0.035-0.070; (3) ethylene terephthalate as a main constituent component and 6-25 mol % diethylene glycol (DEG) constituent in 100 mol % of polyhydric alcohol in all the polyester resin constituting the film; (4) a maximum shrinkage stress of 2-17 MPa in the main shrinkage direction of the film when measured in hot air of 90° C.; and (5) a tensile elongation at break of 20% or more in a direction orthogonal to the main shrinkage direction after the film is aged in an atmosphere with an atmospheric temperature of 40° C. and a relative humidity of 85% for 28 days.

10 Claims, No Drawings

(56) References Cited

FOREIGN PATENT DOCUMENTS

| WO | WO 2018/025801 A | * | 2/2018 |
| WO | 2018-147249 A1 | | 8/2018 |
| WO | WO 2018/198845 A | * | 11/2018 |

OTHER PUBLICATIONS

Intellectual Property India, Hearing Notice in Indian Patent Application No. 202247005151 (Jul. 23, 2024).
Korean Intellectual Property Office, Office Action in Korean Patent Application No. 10-2022-7002446 (Dec. 17, 2024).

* cited by examiner

HEAT-SHRINKABLE POLYESTER FILM

TECHNICAL FIELD

The present invention relates to a heat-shrinkable polyester film, specifically relates to the heat-shrinkable polyester film suitably used as a label for a beverage bottle or for outer packaging of bento of a convenience store. Rupture of the film is hardly to occur in the processes such as printing and bag making after long term-storage coming next to film formation because the film shows no decrease in tensile elongation. In addition, the film shows no reduced shrinkage after aging, therefore, the heat-shrinkable polyester film of the present invention is suitably used for the purposes above-described.

BACKGROUND ART

In recent years, a drawn film, so called heat-shrinkable film, composed of a polyvinyl chloride resin, a polystyrene resin, a polyester resin or the like has been widely used for both the label packaging of a glass bottle and a PET bottle to protect the bottles themselves and to display product information, and also the film has been used for cap sealing and integrated packaging. Among the above-mentioned heat-shrinkable films, a polyvinyl chloride film has a low heat resistance in addition to causing hydrogen chloride gas generation and dioxin at the time of incineration. Also, a polystyrene film has a poor solvent resistance, so an ink with a special composition is required when printing on the film. In addition, the polystyrene film requires to be incinerated at a high temperature, and a large amount of black smoke accompanying odor is generated at the time of incineration. Therefore, a heat-shrinkable film with high heat resistance, easily incinerated, and having excellent solvent resistance has been widely used as a shrinkable label. The usage of the polyester film has been on the increase with raised distribution amount of PET containers.

As a heat-shrinkable polyester film commonly used, the film having large shrinkage in a width direction has widely been used. The film is drawn in the drawing method using a tenter to prepare a wide master film roll, and a film roll product is obtained by winding the master film roll into a film roll with an optional winding length with the master film roll being silt at an optional width. Then the film roll product is subjected to a printing process in a roll form to provide design performance or to display product information. After the printing process, a film roll is slit again to required width and wound into a roll. Then the film roll is made into a tubular bag through a center sealing process by solvent adhesion. The film is wound into a roll, in other words, a roll of label is prepared.

The label wound and made to tubular bag shape is then cut to required length with the label being unwound from the film roll, and a label of annular shape is prepared. The annular-shaped film is used to wrap an object by a method such as covering with hand, and the film is heat shrunk to be a label by a steam tunnel or a hot air tunnel.

A heat-shrinkable polyester film is required to be further improved in its shrinkage property. When the shrinkage stress is too high at the time of shrinking, adhesion part of the above-described tube may be peeled off by the shrinkage. This kind of peeling off of labels leads to significantly worsened appearance of the labels, in addition to the loss of the film's function to protect objects. Also, for containers of bento or daily dish sold at a convenience store or a supermarket, the containers made of thin plastic sheets have been used to reduce the amount of garbage. When the label is used to such thin containers, troubles such as container deformation occur with shrinkage high stress. Importantly, shrinkage stress should not be too high, or not too low to protect an object by tightly covering with the film.

The methods to improve high shrinkage stress have been reported in the past. In Patent Document 1, shrinkage stress is decreased by containing a constituent unit derived from diethylene glycol as a polyhydric alcohol constituent. However, in the case of the film described in Patent Document 1, a film is obtained by uniaxially drawing in a width direction, and tensile elongation in a longitudinal direction may be significantly lowered after long-term storage coming next to film formation. Also, it is known that the hydrolysis of polyester becomes easily proceed by containing a constituent unit derived from diethylene glycol, and reduced molecular weight by hydrolysis may cause decrease in tensile elongation.

The film described above is not necessarily subjected to the post-processes such as printing shortly after the film is formed and wound into a roll. Usually, the film roll is stored or transported at room temperature, or the film roll is subjected to a printing process after a long period of time, more than half a year in some cases. If the tensile elongation of the film is lowered during this long time of storage, the film may cause process trouble by being easily broken when tension is applied in a longitudinal direction in the post-process. When the tensile elongation is decreased significantly, film can't be processed, and this may be a problem.

As the method to improve this decrease in the tensile elongation raised from long-term storage, which may be referred to be as "aging" in other words, the method to draw film biaxially can be mentioned. In the method, film is drawn in a longitudinal direction as well as width direction. The method requires enlarged equipment, and it's not preferable. Though elongation can be kept by increasing the intrinsic viscosity of polyester constituting film, only little is improved by the increase of intrinsic viscosity. In addition, to increase intrinsic viscosity is a costly method because enhancing intrinsic viscosity requires increase in the degree of polymerization of polyester and this leads to prolonged time of polymerization. Also, the method is not preferable in that filtration pressure becomes high at the time of melt extrusion and high-precision filtration becomes difficult.

PRIOR ART DOCUMENT

Patent Document

Patent Document 1: International Publication WO 2018/147249

SUMMARY OF THE INVENTION

Problems to be Solved by the Invention

The present invention aims to provide a heat-shrinkable polyester film having high heat shrinkage in a main shrinkage direction, having low shrinkage stress, and hardly causing decrease in tensile elongation at break with the lapse of time.

The present inventors have completed the present invention as a result of studies in order to solve the above problems. That is, the present invention is composed of the followings.

1. A heat-shrinkable polyester film characterized by satisfying the following (1) to (5):

(1) the film has a shrinkage, hot-water heat shrinkage, of 40% or more in a main shrinkage direction of the film when the film is immersed in hot water of 98° C. for 10 seconds;

(2) the film has a planar orientation coefficient of 0.035 or more and 0.070 or less;

(3) the film has ethylene terephthalate as a main constituent component, and an amount of diethylene glycol (DEG) constituent is 6 mol % or more and 25 mol % or less in 100 mol % of polyhydric alcohol in all the polyester resin constituting the film;

(4) the film has a maximum shrinkage stress of 2 MPa or more and 17 MPa or less in the main shrinkage direction of the film when measured in hot air of 90° C.;

(5) the film has a tensile elongation at break of 20% or more in a direction orthogonal to the main shrinkage direction after the film is aged in an atmosphere with an atmospheric temperature of 40° C. and a relative humidity of 85% for 28 days.

2. The heat-shrinkable polyester film according to above 1, wherein the film has a tensile elongation at break of 100% or more in the direction orthogonal to the main shrinkage direction after the film is aged in an atmosphere with an atmospheric temperature of 40° C. and a relative humidity of 85% for 28 days.

3. The heat-shrinkable polyester film according to above 1 or 2, wherein the polyester film has a difference of less than 5% between a shrinkage before and after aging in a main shrinkage direction measured under the following conditions:

the film before aging is measured for shrinkage after the film is immersed in hot-water of 70° C. for 10 seconds; and the film after aging is first aged in an atmosphere with an atmospheric temperature of 30° C. and a relative humidity of 85% for 28 days and then measured for shrinkage after the aged film is immersed in hot-water of 70° C. for 10 seconds 4. The heat-shrinkable polyester film according to any one of above 1 to 3, wherein the film has a solvent bonding strength of 4 N/15 mm width or more and 15 N/15 mm width or less.

5. The heat-shrinkable polyester film according to any one of above 1 to 4, wherein the film has a natural shrinkage of less than 1.0% when the film is aged in an atmosphere with an atmospheric temperature of 40° C. and a relative humidity of 85% for 28 days.

6. The heat-shrinkable polyester film according to any one of above 1 to 5, wherein the film has an intrinsic viscosity of 0.60 dl/g or more and 0.75 dl/g or less.

7. The heat-shrinkable polyester film according to any one of above 1 to 6, wherein the main shrinkage direction of the film is a width direction of the film.

8. The heat-shrinkable polyester film according to any one of above 1 to 7, wherein the film is a uniaxially stretched film.

9. A label obtained from the heat-shrinkable polyester film according to any one of the above 1 to 8.

10. A package formed by covering at least a part of outer periphery of an object with the label according to above 9 followed by thermally shrinking the label.

Effects of the Invention

The heat-shrinkable polyester film of the present invention has the following characteristics; high heat shrinkage; bonded part of the film is not peeled off at the time of shrinkage because of its low shrinkage stress; the film doesn't cause a container's deformation when an object of a container made of thin plastic sheets is used to be wrapped with. Even after a lapse of time, tensile elongation of the film is not decreased, and troubles which may occur at the time of post-processes after film formation can be decreased.

MODE FOR CARRYING OUT THE INVENTION

Hereinafter, the heat-shrinkable polyester film of the present invention will be described. In general, a heat-shrinkable film is produced by conveying and drawing using a roll. The producing method of a heat-shrinkable film will be described later. A conveyance direction of film is referred to as a longitudinal, vertical, direction, and a direction which is orthogonal to the above-described longitudinal direction is referred to as a width, horizontal, direction of film. Therefore, the width direction of a heat-shrinkable polyester film shown below means a direction vertical to a unwinding direction of a roll, and the longitudinal direction of film means a parallel direction to a unwinding direction of a roll. In the present invention, a main shrinkage direction of film is preferably a width direction.

In the heat-shrinkable polyester film, PET are widely used to copolymerized with the homopolymers constituting of ethylene terephthalate, other polycarboxylic acid constituents and other polyhydric alcohol constituents to obtain high heat-shrinkability. As the polyhydric alcohol constituents for copolymerization, neopentyl glycol and 1,4-cyclohexanedimethanol can be mentioned and are actually widely used. In the case of the film obtained by copolymerization using these constituents, it is known that the heat shrinkage in low temperature of 70° C. or lower is significantly decreased when the film is aged in the atmospheric temperature of room temperature to 40° C. On the other hand, inventors of the present invention found that the decrease in heat shrinkage in low temperature by time lapse was prevented and instead high heat shrinkage and excellent solvent bonding property were shown in the film obtained by copolymerizing PET with diethylene glycol. When diethylene glycol is used and copolymerized to obtain resin raw material, a melting process essential for powder raw material such as neopentyl glycol is of unnecessity, for diethylene glycol is liquid at room temperature. Further, diethylene glycol has higher polymerization activity compared to neopentyl glycol and also has the merit of less foaming during polymerization, foaming leads to decrease in productivity.

The heat-shrinkable polyester film of the present invention has ethylene terephthalate as a main constituent component. "A main constituent component" here means that 50 mol % or more of ethylene terephthalate is contained in all the polymer constituent component constituting the film. Ethylene terephthalate is contained more preferably 70 mol % or more. An excellent mechanical strength and transparency are obtained by using ethylene terephthalate as a main constituent component.

To polymerize ethylene terephthalate, hereinafter may be referred to as PET, any manufacturing methods can be taken. In direct polymerization method, terephthalic acid and ethylene glycol, or other dicarboxylic acid components and diol components as needed are reacted, and dimethyl ester of terephthalic acid (methyl esters of other dicarboxylic acids are contained as needed) and ethylene glycol (other diol components are contained as needed) are transesterified in transesterification method.

Examples of the dicarboxylic acids components other than terephthalic acid and dicarboxylic acids constituting polyester used for the film of present invention include aromatic dicarboxylic acids such as isophthalic acid, naphthalenedicarboxylic acid and orthophthalic acid; aliphatic dicarboxylic acids such as adipic acid, azelaic acid, sebacic acid and decandicarboxylic acid; and alicyclic dicarboxylic acids. Content rate of the dicarboxylic acids other than terephthalic acid in 100 mol % of polycarboxylic acid constituents is preferably 0 mol % or more and 15 mol % or less, more preferably 0 mol % or more and 10 mol % or less, and particularly preferably 0 mol % or more and 4 mol % or less.

When aliphatic dicarboxylic acids such as adipic acid, sebacic acid and decadicarboxylic acid are contained, the content rate is preferably 0 mol % or more and less than 3 mol %. The heat-shrinkable polyester film obtained by using the polyester containing 3 mol % or more of these aliphatic dicarboxylic acids shows insufficient stiffness when film is mounted at high speed.

Preferably, the polycarboxylic acids having a valence of 3 or greater such as trimellitic acid, pyromellitic acid and anhydride thereof are not contained. Shrinkability of necessity become hard to be achieved in the case of the heat-shrinkable polyester film made from the polyester containing those polycarboxylic acids.

Diethylene glycol is required to be 6 mol % or more and 25 mol % or less in 100 ml % of polyhydric alcohol constituting the polyester used for film of the present invention.

Examples of polyhydric alcohol constituents other than ethylene glycol and diethylene glycol which are constituting polyester used for the present invention include aliphatic diols such as 1-3 propanediol, 1-4 butanediol, neopentyl glycol and hexanediol, alicyclic diol such as 1,4-cyclohexanedimethanol, and aromatic diol such as bisphenol A. Content rate of these polyhydric alcohols other than ethylene glycol and diethylene glycol in 100 mol % of polyhydric alcohols is preferably 0 mol % or more and 15 mol % or less, more preferably 0 mol % or more and 10 mol % or less, particularly preferably 0 mol % or more and 4 mol % or less.

Preferably, diols having 8 or more numbers of carbon atoms such as octane diol and polyhydric alcohols having a valence of 3 or greater such as trimethylolpropane, trimeritol ethane, glycerin and diglycerin are not preferably contained. Shrinkability of necessity becomes hard to be achieved when the heat-shrinkable polyester film is obtained by using polyester containing these diols or polyhydric alcohols.

To the resin forming a heat-shrinkable polyester film of the present invention, the additives such as waxes, an antioxidant, an antistatic agent, a crystal-nucleation agent, a viscosity reducing agent, a heat stabilizer, a pigment for coloring, a color protection agent, and an ultraviolet absorber may be added as needed.

Fine particles such as lubricants are added to the resin forming a heat-shrinkable polyester film of the present invention to improve film workability such as slipperiness, and any fine particles are selected. As examples of the particles, silica, alumina, titanium dioxide, calcium carbonate, kaolin, and barium sulfate as inorganic fine particles, and acrylic resin particles, melamine resin particles, silicone resin particles, crosslinked polystyrene particles as organic fine particles are included. The average particle diameter of the fine particles is within the range of 0.05 to 3.0 μm when the particles are measured by a Coulter counter. Particles having a desirable diameter can be selected as needed. The minimum content rate of fine particles in film is preferably 0.01 wt %, more preferably 0.015 wt %, and further preferably 0.02 wt %. When the content rate is less than 0.01 wt %, slipperiness may be decreased. The maximum rate is preferably 1 wt %, more preferably 0.2 wt %, and further preferably 0.1 wt %. When the content rate is larger than 1 wt %, transparency may be undesirably decreased.

The method by which the above-described particles are added to the resin forming a heat-shrinkable polyester film of the present invention is, for example, adding the particles at any stages of reaction in the production of the polyester resin. The particles are preferably added to promote a polycondensation reaction. And the particles are added at the stage of esterification or added as a slurry dispersed in ethylene glycol at the stage after the completion of the transesterification reaction and before the start of the polycondensation reaction. Further, the above-described particles are added preferably by the method of blending a slurry of particles dispersed in ethylene glycol or water and polyester resin raw material using a kneading extruder having a vent, or a method of blending dried particles and polyester resin raw material using a kneading extruder.

A heat-shrinkable polyester film preferably has small decrease in tensile elongation of film by the lapse of time to prevent troubles to occur at the time of processing after long-term storage. In general, molecular orientation greatly contributes to tensile elongation of film. Rigidity of polymer is increased by drawing of molecular chain of the polymer to be stretched, that is, by molecules are being oriented. Entanglement of molecules forms a strong network, and polymers become stronger against tension and elongation is improved. However, it is known that tensile elongation is decreased due to the relaxation of molecular orientation after a long period of time has passed since the film formation, that is, after film is aged. It is also known that tensile elongation is decreased due to the reduction of molecular weight resulted from polyester's hydrolysis by aging. With regard to this aging deterioration, the inventors have found that the decrease in tensile elongation after aging can be prevented by sufficiently enhancing the molecular orientation in film's surface direction, a planar orientation in other words, of the film after film formation. With high planar orientation, it is considered that the rigidity and entanglement of molecules becomes strong enough not to be relaxed by aging, and tensile elongation is not easily decreased even if hydrolysis occurs. The evaluation method of decrease in elongation by aging will be described later. In addition, the method to enhance planar orientation will be described later.

The heat-shrinkable polyester film of the present invention has the heat shrinkage of preferably 40% or more when the film is treated with no load for 10 seconds in a hot water of 98° C. Heat shrinkage in the main shrinkage direction of film is calculated with film's length before and after shrinkage from the following formula 1. The heat shrinkage can be mentioned as hot-water hear shrinkage at 98° C.

heat shrinkage=((length before shrinkage−length after shrinkage)/length before shrinkage)×100 (%)           Formula 1:

When hot-water heat shrinkage in the main shrinkage direction at 98° C. is less than 40%, the amount of shrinkage becomes too small to be used as a label for beverage or as a film for wrapping bento, and wrinkles or slack of label are observed after film is hear shrunk. Hot-water shrinkage of film at 98° C. is preferably 42% or more, and more preferably 45% or more.

Heat shrinkage in the main shrinkage direction at 70° C. is not particularly restricted, preferably the shrinkage is 10% or more and 40% or less. When the shrinkage is less than 10%, the amount of shrinkage becomes too small to be used as a label for a beverage or as a film for wrapping bento, and wrinkles or slack of label are observed after film is heat shrunk. Also, when the shrinkage is 40% or more, abrupt shrinkage is generated inside of film shrinking tunnel using steam, and this leads to wrinkles and distortion to be generated. The shrinkage is more preferably 15% or more and 35% or less, particularly preferably 20% or more and 30% or less.

Planar orientation coefficient is preferably 0.035 or more and 0.070 or less. Planar orientation coefficient is calculated from the following formula 2.

$$\text{Planar orientation coefficient } \Delta P=(Nx+Ny)/2-Nz \quad \text{Formula 2:}$$

Nx: refractive index in longitudinal direction of film
Ny: refractive index in width direction of film
Nz: refractive index in thickness direction of film When planar orientation coefficient is smaller than 0.035, initial breakage by aging described later becomes worse, and tensile elongation becomes undesirably decreased when film is stored for a long time after film formation. With the planar orientation coefficient exceeding 0.070, crystallinity becomes too high, and solvent bonding strength at the time of making a tubular bag of film becomes undesirably decreased. Planar orientation coefficient is more preferably 0.040 or more and 0.065 or less, and further preferably 0.045 or more and 0.060 or less Diethylene glycol in 100 mol % of polyhydric alcohol constituents comprising the polyester used for the film of present invention is preferably 6 mol % or more and 25 mol % or less. When the amount of diethylene glycol is less than 6 mol %, undesirably, shrinkage of film after aging and immersion in hot water of 70° C. for 10 seconds is significantly decreased.

When the amount of diethylene glycol exceeds 25 mol %, planar orientation coefficient is decreased, and decrease in tensile elongation with the passing of time undesirably becomes easier to occur. The content ratio of diethylene glycol is more preferably 10 mol % or more and 23 mol % or less, and further preferably 12 mol % or more and 21 mol % or less.

The heat-shrinkable polyester film of the present invention has the maximum heat shrinkage stress of preferably 2 MPa or more and 17 MPa or less measured in hot air of 90° C. Measurement of shrinkage stress is carried out in the same manner as described in Examples.

When the maximum heat shrinkage stress at 90° C. exceeds 17 MPa in the main shrinkage direction, undesirably, floating or peeling off emerges at the adhesive part of a label, or this shrinkage stress may also lead to a thin container being crushed by shrinkage stress at the time of shrinkage in the case of thin container. The maximum shrinkage at 90° C. is more preferably 15 MPa or less, further preferably 13 MPa or less. With the maximum shrinkage stress at 90° C. is below 2 MPa, undesirably, a label becomes loosen and is not tightly mounted onto a container when film is used as a label for a container. The maximum shrinkage stress at 90° C. is more preferably 3 MPa or more, and further preferably 4 MPa or more.

In its main shrinkage direction, the polyester film used in the present invention has tensile elongation at break of 20% or more when film is aged in an atmosphere with an atmospheric temperature of 40° C. and a relative humidity of 85% for 28 days. If the tensile elongation at break after aging is below 20%, undesirably, troubles such as breakage become easier to occur due to the tension while being processed after long-term storage. More preferable range of tensile elongation at break before and after aging is 100% or more, further preferably 200% or more, and particularly preferably 300% or more. The higher tensile elongation at break is, the more preferable it is, but the maximum limit is 700% in the case of the present invention.

The heat-shrinkable polyester film of the present invention has the difference of shrinkage of 0% or higher and 5% or lower. To measure the difference, the shrinkage before aging and the shrinkage after aging in an atmosphere with an atmospheric temperature of 40° C. and a relative humidity of 85% for 28 days are compared. The shrinkage in both cases are measured after immersion in hot-water of 70° C. for 10 seconds. With the shrinkage difference described above exceeding 5%, shrinkage at low temperature becomes decreased after long-term storage of the film formed, and this decrease in shrinkage undesirably causes wrinkles or shrinkage spots at the time of shrinkage as a label. More preferably shrinkage difference is 4% or less, and particularly preferably 3% or less. The smaller the shrinkage difference is, the more preferable it is. However, 0% is the lower limit of the shrinkage difference because it's hard to think that shrinkage will be increased after aging.

The heat-shrinkable polyester of the present invention has solvent bonding strength of preferably 4 N/15 mm or more. When the solvent bonding strength is less than 4 N/15 mm, shrinkage force makes the solvent bonded part undesirably easily peeled off at the time of label's heat shrinkage. Solvent bonding strength is more preferably 5 N/15 mm or more, and particularly preferably 7 N/15 mm or more. The higher solvent bonding strength is, the more preferable it is. However, the upper limit of solvent bonding strength is considered to be around 15 N/15 mm. When the solvent bonding strength is too high, film often becomes bonded too strongly when two pieces of film are bonded by solvent to form a label. This phenomenon leads to the decrease in productivity, so the solvent bonding strength may be 10 N/15 mm or less considering of actual use.

The heat-shrinkable polyester film of the present invention has natural shrinkage of preferably 1.0% or less when the film is aged in an atmosphere with an atmospheric temperature of 40° C. and 85% RH for 28 days. The evaluation method of the natural shrinkage is shown in Examples.

With the natural shrinkage more than 1.0%, film rolls become easier to be wrinkled when products wound into a rolls are stored. The smaller natural shrinkage is, the more preferable it is. The natural shrinkage is preferably 0.9 or less, and more preferably 0.8% or less.

The heat-shrinkable polyester film of the present invention has intrinsic viscosity (IV) of preferably 0.60 dl/g or more and 0.75 dl/g or less. With the intrinsic viscosity of 0.60 dl/g or more, tensile elongation is not decreased even after long-term storage of film, and therefore, troubles such as breakage at the time of processing or defection can be decreased. The upper limit of intrinsic viscosity is 0.75 dl/g because of the following reasons. To enhance intrinsic viscosity, polymerization degree of polyester needs to be raised. It's a costly way of enhancing the intrinsic viscosity, for the method requires longer time for polymerization. And besides, high-precision filtration becomes difficult due to significant increase in filtering pressure at the time of melt extrusion.

Thickness of the heat-shrinkable polyester film of the present invention is not particularly restricted. To the use of the heat-shrinkable film as a label or for wrapping bento, thickness of the film is preferably 8 to 100 µm, and more preferably 10 to 60 µm. With the film thickness less than 8 µm, film stiffness significantly decreases, and film rolls become undesirably easier to be wrinkled. Even if the film is thick, the thickness is not matter as a film roll, but film is formed to be thin from a view point of its cost. Film thickness is more preferably 10 to 58 μm, and more preferably 12 to 56 μm.

The heat-shrinkable polyester film of the present invention is obtained by melt extruding the above-described polyester raw material from an extruder to form undrawn film, and then by drawing the undrawn film in width direction. The polyester is prepared by polymerizing suitable dicarboxylic acid constituent and diol constituent both described above by a known method. In most cases, chip-shaped polyester is used as a raw material of film.

Polyester raw material is preferably dried using a dryer such as a hopper dryer, a paddle dryer, or a vacuum dryer when resin material is melt-extruded. After dried in such a way, the polyester raw material is molten at 230 to 270° C. and extruded into film using an extruder. Any existing method such as a T-die method or a tubular method can be adopted for extrusion.

An undrawn film is then obtained by quenching the sheet-shaped molten resin after extrusion. As a method to quench molten resin, the method in which molten resin is cast from a mouthpiece onto a rotating drum for quenching solidification to obtain an undrawn substantially unoriented resin sheet is preferably adopted.

By drawing thus obtained undrawn film in width direction under certain conditions, the heat-shrinkable polyester film of the present invention can be obtained. Hereinafter, description about the drawing applicable to obtain heat-shrinkable polyester film of the present invention will be given.

Usually, a heat-shrinkable polyester film is produced by drawing undrawn film in the direction expected to have shrinkability. In the present invention, film is uniaxially drawn in a width direction which is a main shrinkage direction of the film. The production means by which undrawn film is uniaxially drawn in a width direction are advantageous in that drawing of film can be carried out without equipment for longitudinally drawing of film and simple equipment meets the requirement.

To draw film in a width direction, undrawn film is first introduced to a tenter in which the film can be heated with both edges of the film being grasped with clips. After the film is preheated to the temperature of Tg+10° C. or higher and 25° C. or lower by hot air, the film is then drawn by increasing the distance between the clips with the conveyance of the film in longitudinal direction.

Drawing ratio of undrawn film is preferably 4.5 times or more and 6 times or less. When the drawing ratio is smaller than 4.5, planar orientation coefficient required undesirably becomes hard to be obtained. When the drawing ratio exceeds 6 times, undesirably, the risk of film breakage at the time of film formation become increases, and long and large equipment is required. More preferably, the ratio is 4.7 times or more and 5.8 times or less.

Drawing strain rate of film preferably differs between the first half and the latter half of drawing. The ratio obtained by the comparison of drawing strain rate of first and latter half of drawing, the ratio of strain by drawing, is described by the following formula. Drawing strain ratio is preferably 2.5 or more and 5.0 or less. Drawing strain rate is expressed by the unit "%/s", nominal strain per second.

drawing strain ratio=(drawing strain rate of latter half drawing)/(drawing strain rate of first half of drawing)     Formula 3:

The first half of drawing here means drawing until the drawing ratio becomes square root value of final drawing ratio or smaller, and the latter half of drawing means drawing after that, drawing when the drawing ratio is the square root value or larger. For example, when the final drawing ratio is 5.0 times, the first half indicates drawing till the ratio becomes 2.2 times and drawing at latter half indicates drawing having drawing ratio of 2.3 times or larger.

When the drawing strain ratio is less than 2.5, required planar orientation coefficient is not undesirably obtained. With the drawing strain ratio larger than 5.0, undesirably, breakage at the time of drawing becomes easier to happen as well as increase in film's shrinkage stress. The drawing strain ratio is more preferably 2.7 or larger and 4.8 or smaller, further preferably 2.9 or larger and 4.6 or smaller.

Total drawing strain rate from the start to the end of drawing is preferably 10%/sec or larger and 30% sec or less. With the total drawing strain rate less than 10%/sec, undesirably, molecular orientation becomes small and initial breakage with time becomes worse. When the rate is larger than 30%/sec, film's shrinkage becomes undesirably too high. More preferably, the rate is 13% or more and 27% or less, and further preferably 16% or more and 24% or less.

As described above, drawing strain ratio is required to be 2.5 or more and 5.0 or less, that is, drawing at latter half has higher drawing rate and strain rate is accelerated. As a results of the inventor's research, by increasing the strain rate during the latter half of drawing, film's molecular orientation and planar orientation coefficient become high and, and therefore decrease in elongation with time becomes hard to occur. In a stress strain curve in the thermal tensile test of undrawn film, it is known that the stress value increases significantly in the latter half of stretching. Therefore, it is considered that the molecular orientation progresses significantly in the latter half of stretching. In other words, it is considered that the shrinkage stress becomes higher with more increase in molecular orientation by enhancing the drawing rate in the latter half of stretching. Conventionally, in tenter drawing, drawing has been performed at almost constant speed from the start to the end of drawing. That is, the drawing strain ratio of film is approximately 1, and it seems effective to draw film at higher drawing strain rate to increase molecular orientation. However, the energy given by the drawing to film becomes large, and shrinkage stress of film after drawing by the lapse of time becomes undesirably too high. Importantly, the drawing strain rate in the first half of drawing should be low with high as well as drawing strain rate in the last half of drawing should be high to reduce shrinkage stress in a main shrinkage direction of film. In particular, to achieve the reduced shrinkage stress with the elongation in a direction vertical to a main shrinkage direction being prevented from recrease.

Specifically, drawing strain rate is regulated by the adjustment of conveying speed of film in a tenter or by adjusting tenter pattern. Also, drawing strain ratio is regulated by adjustment of tenter pattern.

Film may not be drawn in longitudinal direction, for large-scale equipment is needed. It's not restricted in particular, heat treatment may be performed to film to adjust shrinkage after drawing in a width direction. The temperature at which film is subjected to heat treatment is 70° C. or higher and 110° C. or lower. If the temperature at which film is heat treated is lower than 70° C., shrinkage in width direction at 70° C. exceeds 40%, and it is not preferable. And if the temperature at which film is heat treated is higher than 110° C., undesirably, shrinkage in a width direction at 98° C. is less than 40%. The temperature is more preferably 75° C.

or higher and 105° C. or lower, and further preferably 80° C. or higher and 100° C. or lower.

Film temperature at the time of drawing in a width direction is preferably Tg+5° C. or higher and Tg+40° C. or lower. When film temperature is less than Tg+5° C., drawing strength becomes too high and the shrinkage stress of film undesirably becomes high. When film temperature is higher than Tg+40° C., drawing strength becomes too low. And this low drawing strength undesirably accompanies decrease in planar orientation with no molecular orientation given and also easier occurrence of reduced elongation. It's not particularly restricted, film temperature may be the same both at the first half and latter half of drawing. Preferably the temperature may be higher at the latter half of drawing than at the first half of drawing, for the temperature difference contributes to obtain high planar orientation.

A package of the present invention is obtained by heat shrinking the heat-shrinkable polyester film of the present invention which wraps around an object by at least a part of periphery. The object may be, for example, PET bottles for beverages, bins, cans, plastic containers for confectionery or bento, or paper boxes. When labels obtained from the heat-shrinkable polyester film is heat-shrunk to cover the objects, the label is usually heat-shrunk by 5 to 70% to wraps tightly around the objects. The label covering the objects may be with print on them, or may be without print.

The label is formed as follows. Organic solvent is applied to a little inside from one end of rectangular shaped film, and the film is immediately rolled up with one end to overlap onto the other end for adhesion. The tubular film is then cut into label. Organic solvent for adhesion is preferably cyclic ethers such as 1,3-dioxolane or tetrahydrofuran. In addition, aromatic hydrocarbons such as benzene, toluene, xylene and trimethylbenzene, halogenated hydrocarbons such as methylene chloride and chloroform, and phenols such as phenol and the like are used alone or in combination.

EXAMPLES

The present invention is hereinafter described in more detail with references to Examples, but the present invention is not restricted by the following Examples, carried out with appropriate modifications made to the extent adaptable to the gist of the present invention.

Evaluation methods for films are as follows.

Tg (Glass Transition Point)

Tg (° C.) was measured in accordance with JIS-K 7121-1987 using a differential scanning calorimeter (DSC220, Seiko Instruments). After placing 5 mg of an undrawn film in a sample pan, the sample pan was closed with a lid. The measurement was carried out with the temperature raised from −40° C. to 120° C. at a temperature rising rate of 10° C./min in a nitrogen gas atmosphere.

Intrinsic Viscosity (IV)

After a test sample was prepared by dissolving 0.2 g of polyester in 50 ml of a mixed solvent of phenol/1,1,2,2-tetrachloroethane=60/40 by weight, intrinsic viscosity of the sample was measured by an Ostwald viscometer at 30° C. The unit of intrinsic viscosity is dl/g.

Heat Shrinkage (Hot-Water Heat Shrinkage)

Film was cut into a square of 10 cm×10 cm and then immersed in hot water of a predetermined temperature±0.5° C. in no load state for 10 seconds to be heat-shrunk, followed by immersion of the film in hot water of 25° C.±0.5° C. for 10 seconds. Then, the film was taken from the water, and the dimensions of the film were measured both in the lengthwise and in the lateral directions. The heat shrinkage of each direction was calculated from the following formula 1. A direction having a larger heat shrinkage was defined as a main shrinkage direction.

heat shrinkage=((length before shrinkage-length after shrinkage)/length before shrinkage)×100(%)   Formula 1:

Maximum Value of Shrinkage Stress

A strip shape of film sample with a length of 150 mm in a longitudinal direction and a width of 20 mm was cut out from a heat-shrinkable film. Shrinkage stress of the sample was measured with "TENSILON PTM-250" (TENSILON is a registered trademark of ORIENTEC CORPORATION), a strength and elongation measuring machine having a heating furnace manufactured by Toyo Baldwin Co. Ltd. which is known for the current company name of ORIENTEC CORPORATION. Inside of the heating furnace of the strength and elongation measuring machine was preheated to 90° C., and a distance between chucks to hold film samples with was set to 100 mm. The air blast blown into the heating furnace was stopped to open the door of the heating furnace to set the film sample. The film sample with the length of 150 mm was held by the chucks by 25 mm at both ends, the distance between the chucks was set to 100 mm, and the sample was fixed tightly so that the direction in which the chucks were connected corresponded to the longitudinal direction of the film and that the sample became horizontal. After the sample was set to the chucks, the door of the heating furnace was closed promptly, and air blast was resumed. With the starting time of shrinkage stress measurement defined as the time of the door's closure to resume air blast, the maximum measurement value of shrinkage stress was determined as the maximum value of shrinkage stress which is referred to as maximum shrinkage stress (MPa). The shrinkage stress was measured for a period of 30 seconds from the starting point of measurement.

Changes in Shrinkage with Time

Film sample was placed for aging in an atmosphere of 40° C. and 85% RH for 28 days (672 hours), hot-water shrinkage described above was measured to obtain hot-water shrinkage at 70° C. in a longitudinal direction. To the measurement value, a difference from hot-water shrinkage stress at 70° C. in the longitudinal direction before aging was calculated, and the difference was defined as 'difference in shrinkage before and after aging'.

Solvent Bonding Strength

To a heat-shrinkable film, 1,3-dioxolane was applied with a quantity of 5±0.3 g/m² and application width of 5±1 mm, and the coated surface was sealed by laminating two pieces of film. A piece of sample film was obtained by cutting the film with the width of 15 mm in a direction orthogonal to sealing direction. Then the film was set to a tensile testing machine "STM-50" manufactured by Toyo Baldwin Co. Ltd. The sample was set with a distance of 20 mm between the chucks, and peeled off at an elastic stress of 200 m/mins to measure peeling resistance. The peeling resistant strength was defined as solvent bonding strength.

Natural Shrinkage

A piece of film sample was obtained by cutting film with a length of 200 mm in a main shrinkage direction and 30 mm in the orthogonal direction, and an indicative line of 150 mm length was drawn in the main shrinkage direction. After the film was aged in an atmosphere with a temperature of 40° C. and 85% RH for 28 days, the length of the indicative line was measured, and natural shrinkage was calculated according to the following formula.

natural shrinkage=(length of indicative line before aging (150 mm)−length of indicative line after aging)÷(length of indicative line before aging (150 mm))×100(%)  Formula 4:

Planar Orientation Coefficient

Using "Abbe refractometer 4T type", refractive index of film in longitudinal, width and thickness directions were measured after samples were placed in an atmosphere of 23° C. and 65% RH for two hours or more. Planar orientation coefficient was obtained by the calculation according to the following formula 2 from the measurement results.

Planar orientation coefficient $\Delta P=(Nx+Ny)/2-Nz$  Formula 2:

Nx: Refractive index in longitudinal direction of film
Ny: Refractive index in width direction of film
Nz: Refractive index in thickness direction of film Tensile Elongation at Break A test piece of film was prepared by sampling a rectangular shaped film with a length of 50 mm in a direction orthogonal to the main shrinkage direction (longitudinal direction of the film) and with a length of 20 mm in a main shrinkage direction (width direction of the film). According to JIS-K 7127 and using a tensile testing machine "Autograph", tensile test was carried out. Autograph is a registered trademark of the manufacturer, Shimadzu Corporation. Both ends of the test piece, both in the long direction, were grasped and tested for tension at an elastic stress of 200 m/mins. The elongation at break was regarded as tensile elongation at break. Tensile test was carried out to the samples after film formation and the samples being aged in an atmosphere of 40° C. and 85% RH for 28 days.

Shrinkage Finishing Property Before and After Aging

To a heat-shrinkable film, three-color printing was performed in advance with inks of grass, gold, and white colors manufactured by TOYO INK CO., LTD. A cylindrical label which has a main shrinkage direction of heat shrinkable film as a circumferential direction was prepared by bonding both ends of the printed film with dioxolane. The cylindrical label was cut, and the diameter of the cut label in a shrinkage direction was 70 mm. The label wrapped around a PET bottle of 500 ml (body diameter 62 mm, minimum neck diameter 25 mm), and the label was heat-shrunk with a steam tunnel (SH-1500-L, Fuji Astec, Inc.) under the conditions of; 4 seconds of passing time, zone temperature of 90° C. The neck part having a diameter of 30 mm was adjusted to be overlapped to one end of the label at the time of label wrapping. Shrinkage finishing property after shrinkage was visually checked to be evaluated, and the criteria were as follows.

Shrinkage Strain of Label

As an evaluation of shrinkage finishing property, the maximum strain was decided. Strain of label at the top of the label n 360° directions was measured using a strain gauge. Label strain was evaluated according to the following criteria.

○: maximum distortion, less than 2.0 mm
x: maximum distortion, 2.0 mm or more

Insufficient Label Shrinkage

Label shrinkage described above was evaluated according to the following criteria.

○: heat-shrunk with no slack between label and container
x: with slack between label and container due to insufficient shrinkage Wrinkles of Label Under the same conditions as described above in the case of the label's shrinkage strain, label's wrinkles were evaluated according to the following criteria.

○: two or less numbers of wrinkles, each 2 mm or more in size
x: three or more numbers of wrinkles, each 2 mm or more in size Peeling Off of Bonded Part Label shrinkage described above was evaluated according to the following criteria.

○: without peeling off of bonding part
x: with peeling off of bonding part of

Preparation of Polyester Raw Material

Synthetic Example 1

To a stainless steel autoclave equipped with a stirrer, a thermometer and a partially circulating cooler, 100 mol % of dimethyl terephthalate (DMT) as a dicarboxylic acid constituent, 100 mol % of ethylene glycol (EG) as a polyhydric alcohol constituent were added so that the amount of ethylene glycol became 2.2 times that of dimethyl terephthalate in a molar ratio. An ester exchange reaction was carried out with the addition of 0.05 mol % of zinc acetate (based on the acid component) as an ester exchange catalyst and 0.225 mol % of antimony trioxide (based on the acid component) as polycondensation catalyst while distilling away the generated methanol from the system. Thereafter, a polycondensation reaction was carried out at 280° C. under reduced pressure of 26.7 Pa to obtain polyester 1 with intrinsic viscosity of 0.75 dl/g. The composition of polyester 1 is shown in Table 1.

Synthetic Examples 2 to 5

Polyesters 2 to 5 shown in Table 1 were obtained in the same manner as in Synthetic Example 1. In the production of polyester 2, $SiO_2$ (Silysia 266, FUJI SILYSIA CHEMICAL LTD.) having an average particle diameter of 1.5 μm was added as a lubricant to polyester at a rate of 7200 ppm. In Table 1, NPG represents neopentyl glycol and CHDM represents 1,4-cyclohexanedimethanol. The intrinsic viscosities of each polyester were 2: 0.75 dl/g, 3: 0.75 dl/g, 4: 0.75 dl/g, 5: 0.75 dl/g. The polyesters were appropriately formed into chips. The compositions of each polyester are shown in Table 1.

TABLE 1

| | Polyester raw material composition (mol %) | | | | | |
| --- | --- | --- | --- | --- | --- | --- |
| | dicarboxylic acid component | Polyhydric alcohols component | | | | addition amount of lubricant |
| | DMT | EG | DEG | NPG | CHDM | (ppm) |
| Polyester 1 | 100 | 100 | 0 | 0 | 0 | 0 |
| Polyester 2 | 100 | 100 | 0 | 0 | 0 | 7200 |
| Polyester 3 | 100 | 40 | 60 | 0 | 0 | 0 |

TABLE 1-continued

| | Polyester raw material composition (mol %) | | | | | addition amount of lubricant (ppm) |
|---|---|---|---|---|---|---|
| | dicarboxylic acid component | Polyhydric alcohols component | | | | |
| | DMT | EG | DEG | NPG | CHDM | |
| Polyester 4 | 100 | 70 | 0 | 30 | 0 | 0 |
| Polyester 5 | 100 | 75 | 0 | 0 | 25 | 0 |

※DMT: dimethylterephthalate
EG: ethylene glycol
DEG: diethylene glycol
NPG: neopentylglycol
CHDM: cyclohexanedimethanol Example 1

Polyester 1, polyester 2, and polyester 3 described above were mixed in the mass ratio of 80:5:15, and the mixed resin was introduced into an extruder. Then, the mixed resin was molten at 280° C. and extruded from a T-die, and quenched by winding around a rotating metal roll cooled to a surface temperature of 30° C. to obtain an undrawn film of 144 μm thickness. Tg of the undrawn film was 72° C. The undrawn film was introduce to a tenter, the film was preheated till the temperature of the film reached 82° C. (Tg+10° C.) with both ends of the film being grasped by clips, and then the film was laterally drawn by 4.8 times at the film temperature of 82° C. (Tg+10° C.). A drawing strain rate at the first half of drawing, drawing till the drawing ratio becomes 2.2 times, was 12.5%/sec, and a drawing strain rate at the latter half of drawing was 37.3%/sec. Total drawing strain rate was 23%/sec, and drawing ratio was 3.0. After the drawing, film was subjected to heat treatment at a film temperature of 85° C. in a tenter with the film width being fixed. After the drawing, both edges of the film were cut off. The uniaxially drawn film having a thickness of 30 μm was continuously formed over a prescribed length. The uniaxially drawn film was then wound into a roll, and a film roll of heat-shrinkable polyester film was obtained. The obtained film was evaluated in its properties in the methods described above. The manufacturing conditions are shown in Table 2, and the evaluation results are shown in Table 3.

Example 2

From example 1, a drawing ratio in a lateral direction was changed to 5.3 times and film temperatures at the time of preheating and drawing were changed to 83° C., and resin extrusion quantity was regulated to obtain a film with a thickness of 30 μm after drawing.
A drawing strain rate at the first half of drawing, drawing till the drawing ratio became 2.3 times, was 14.3%/sec, and the drawing strain rate at the latter half of drawing was 40.4%/sec. Total drawing strain rate was 26%/sec, and drawing ratio was 2.8. Other than the above, polyester film was prepared in the same manner as Example 1. The manufacturing conditions are shown in Table 2, and the evaluation results are shown in Table 3.

Example 3

From example 1, a drawing ratio in a lateral direction was changed to 5.8 times and film temperatures at the time of preheating and drawing were changed to 87° C., and resin extrusion quantity was regulated to obtain a film with a thickness of 30 μm after drawing.
The drawing strain rate at the first half of drawing, drawing till the drawing ratio became 2.4 times, was 16.0%/sec, and the drawing strain rate at the latter half of drawing was 43.9%/sec. Total drawing strain rate was 29%/sec, and drawing ratio was 2.7. Other than the above, polyester film was prepared in the same manner as Example 1. The manufacturing conditions are shown in Table 2, and the evaluation results are shown in Table 3.

Example 4

Polyester 1, polyester 2, and polyester 3 described above were mixed in the mass ratio of 70:5:25, and the mixed resin was introduce into an extruder. Film temperatures at the time of preheating and drawing were changed to 76° C. Polyester of Example 4 was prepared in the same manner as Example 1 except for the changes. Tg of the undrawn film was 68° C. The manufacturing conditions are shown in Table 2, and the evaluation results are shown in Table 3.

Example 5

From Example 4, a drawing ratio in a lateral direction was changed to 5.3 times and film temperatures at the time of preheating and drawing were changed to 77° C., and the resin extrusion quantity was regulated to obtain a film with a thickness of 30 μm after drawing.
A drawing strain rate at the first half of drawing, drawing till the drawing ratio became 2.3 times, was 14.3%/sec, and the drawing strain rate at the latter half of drawing was 40.4%/sec. Total drawing strain rate was 26%/sec, and drawing ratio was 2.8. Other than the above, polyester film was prepared in the same manner as Example 4. The manufacturing conditions are shown in Table 2, and the evaluation results are shown in Table 3.

Example 6

From Example 4, a drawing ratio in a lateral direction was changed to 5.8 times and film temperatures at the time of preheating and drawing were changed to 81° C., and the resin extrusion quantity was regulated to obtain a film with a thickness of 30 μm after drawing.
The drawing strain rate at the first half of drawing, drawing till the drawing ratio became 2.4 times, was 16.0%/sec, and the drawing strain rate at the latter half of drawing was 43.9%/sec. Total drawing strain rate was 29%/sec, and drawing ratio was 2.7. Other than the above, polyester film was prepared in the same manner as Example 4. The manufacturing conditions are shown in Table 2, and the evaluation results are shown in Table 3.

Example 7

Polyester 1, polyester 2, and polyester 3 described above were mixed in the mass ratio of 58:5:37, and the mixed resin was introduced to an extruder. Film temperatures at the time of preheating and drawing were changed to 75° C. Polyester of Example 7 was prepared in the same manner as Example 2 except for the changes. Tg of the undrawn film was 62° C. The manufacturing conditions are shown in Table 2, and the evaluation results are shown in Table 3.

Example 8

From Example 7, a drawing ratio in a lateral direction was changed to 5.8 times and film temperatures at the time of preheating and drawing were changed to 77° C., and the resin extrusion quantity was regulated to obtain a film with a thickness of 30 μm after drawing.

A drawing strain rate at the first half of drawing, drawing till the drawing ratio became 2.4 times, was 16.0%/sec, and the drawing strain rate at the latter half of drawing was 43.9%/sec. Total drawing strain rate was 29%/sec, and drawing ratio was 2.7. Other than the above, polyester film was prepared in the same manner as Example 7. The manufacturing conditions are shown in Table 2, and the evaluation results are shown in Table 3.

Example 9

From Example 7, a drawing ratio in a lateral direction was changed to 4.8 times and film temperatures at the time of preheating and drawing were changed to 77° C., and the resin extrusion quantity was regulated to obtain a film with a thickness of 30 μm after drawing.

The drawing strain rate at the first half of drawing, drawing till the drawing ratio became 2.2 times, was 12.0%/sec, and the drawing strain rate at the latter half of drawing was 39.5%/sec. Total drawing strain rate was 23%/sec, and drawing ratio was 3.3. Other than the above, polyester film was prepared in the same manner as Example 7. The manufacturing conditions are shown in Table 2, and the evaluation results are shown in Table 3.

Example 10

The drawing strain rate at the first half of drawing, drawing till the drawing ratio became 2.2 times, was 11.5%/sec, and the drawing strain rate at the latter half of drawing was 42.3%/sec. Total drawing strain rate was 23%/sec, and drawing ratio was 3.7. Other than the above, polyester film was prepared in the same manner as Example 9. The manufacturing conditions are shown in Table 2, and the evaluation results are shown in Table 3.

Comparative Example 1

Polyester 1, polyester 2, and polyester 3 described above were mixed in the mass ratio of 87:5:8 and the mixed resin was introduce to an extruder. Film temperatures at the time of preheating and drawing were changed to 84° C. Polyester of Example 7 was prepared in the same manner as Example 1 except for the changes. Tg of the undrawn film was 73° C. The manufacturing conditions are shown in Table 2, and the evaluation results are shown in Table 3.

Comparative Example 2

Polyester 1, polyester 2, and polyester 3 described above were mixed in the mass ratio of 87:5:8, and the mixed resin was introduce to an extruder. Film temperatures at the time of preheating and drawing were changed to 84° C. Polyester of Comparative Example 2 was prepared in the same manner as Example 3 except for the changes. Tg of the undrawn film was 73° C. The manufacturing conditions are shown in Table 2, and the evaluation results are shown in Table 3.

Comparative Example 3

Polyester 1, polyester 2, and polyester 3 described above were mixed in the mass ratio of 45:5:50, and the mixed resin was introduce to an extruder. Film temperatures at the time of preheating and drawing were changed to 72° C. Polyester of Comparative Example 3 was prepared in the same manner as Example 3 except for the changes. Tg of the undrawn film was 60° C. The manufacturing conditions are shown in Table 2, and the evaluation results are shown in Table 3.

Comparative Example 4

The drawing strain rate at the first half of drawing, drawing till the drawing ratio became 2.3 times, was 30.0%/sec, and the drawing strain rate at the latter half of drawing was 24.6%/sec. Total drawing strain rate was 29%/sec, and drawing ratio was 0.8. Other than the above, polyester film was prepared in the same manner as Example 7. The manufacturing conditions are shown in Table 2, and the evaluation results are shown in Table 3.

Comparative Example 5

Polyester 1, polyester 2, and polyester 4 described above were mixed in the mass ratio of 45:5:50, and the mixed resin was introduce to an extruder. Film temperatures at the time of preheating and drawing were changed to 76° C. Polyester of Comparative Example 5 was prepared in the same manner as Example 1 except for the changes. Tg of the undrawn film was 75° C. The manufacturing conditions are shown in Table 2, and the evaluation results are shown in Table 3.

Comparative Example 6

Polyester 1, polyester 2, and polyester 5 described above were mixed in the mass ratio of 45:5:60, and the mixed resin was introduce to an extruder. Film temperatures at the time of preheating and drawing were changed to 76° C. Polyester of Comparative Example 6 was prepared in the same manner as Example 1 except for the changes. Tg of the undrawn film was 73° C. The manufacturing conditions are shown in Table 2, and the evaluation results are shown in Table 3.

Comparative Example 7

Polyester 1, polyester 2, polyester 3, and polyester 4 described above were mixed in the mass ratio of 4:5:25:66, and introduced to an extruder. Polyester was prepared in the same manner as Example 1, and an undrawn sheet of 153 μm thickness was obtained. Tg of the undrawn film was 68° C. The undrawn film was introduce to a tenter, and was preheated till the film temperature reached 73° C. (Tg+5° C.) with both ends of the film being grasped by clips. Then the film was drawn by 5.1 times in a lateral direction at the film temperature of 73° C. (Tg+5° C.). At this time, the drawing strain rate at the first half of drawing, drawing till the drawing ratio became 2.2 times, was 23.0%/sec, and the drawing strain rate at the latter half of drawing was 23.0%/sec. Total drawing strain rate was 23%/sec, and drawing ratio was 1.0. After the drawing, the film was relaxed by 5% in a tenter in a lateral direction while the film was taking a heat treatment at the film temperature of 74° C. After the tenter process, both edges of the film were cut off. The uniaxially drawn film having a thickness of 30 μm was continuously formed over a prescribed length. The uniaxially drawn film was then wound into a roll, and a film roll of heat-shrinkable polyester film was obtained. The manufacturing conditions are shown in Table 2, and the evaluation results are shown in Table 3.

TABLE 2

| | Raw material ratio | drawing ratio first half | drawing ratio letter half | drawing ratio total | drawing temperature (° C.) first half | drawing temperature (° C.) letter half | drawing strain rate (%/sec) first half | drawing strain rate (%/sec) letter half | drawing strain rate (%/sec) total | drawing srtrain ratio | temperature of heat fixing after drawing (° C.) |
|---|---|---|---|---|---|---|---|---|---|---|---|
| Example 1 | Polyester 1/2/3 = 80/5/15 | 2.2 | 2.2 | 4.8 | 82 | 82 | 12.5 | 37.3 | 23.0 | 3.0 | 85 |
| Example 2 | Polyester 1/2/3 = 80/5/15 | 2.3 | 2.3 | 5.3 | 83 | 83 | 14.3 | 40.4 | 26.0 | 2.8 | 85 |
| Example 3 | Polyester 1/2/3 = 80/5/15 | 2.4 | 2.4 | 5.8 | 87 | 87 | 16.0 | 43.9 | 29.0 | 2.7 | 85 |
| Example 4 | Polyester 1/2/3 = 70/5/25 | 2.2 | 2.2 | 4.8 | 76 | 76 | 12.5 | 37.3 | 23.0 | 3.0 | 85 |
| Example 5 | Polyester 1/2/3 = 70/5/25 | 2.3 | 2.3 | 5.3 | 77 | 77 | 14.3 | 40.4 | 26.0 | 2.8 | 85 |
| Example 6 | Polyester 1/2/3 = 70/5/25 | 2.4 | 2.4 | 5.8 | 81 | 81 | 16.0 | 43.9 | 29.0 | 2.7 | 85 |
| Example 7 | Polyester 1/2/3 = 58/5/37 | 2.3 | 2.3 | 5.3 | 75 | 75 | 14.3 | 40.4 | 26.0 | 2.8 | 85 |
| Example 8 | Polyester 1/2/3 = 58/5/37 | 2.4 | 2.4 | 5.8 | 77 | 77 | 16.0 | 43.9 | 29.0 | 2.7 | 85 |
| Example 9 | Polyester 1/2/3 = 58/5/37 | 2.2 | 2.2 | 4.8 | 77 | 77 | 12.0 | 39.5 | 23.0 | 3.3 | 85 |
| Example 10 | Polyester 1/2/3 = 58/5/37 | 2.2 | 2.2 | 4.8 | 77 | 77 | 11.5 | 42.3 | 23.0 | 3.7 | 85 |
| Comparative Example 1 | Polyester 1/2/3 = 87/5/8 | 2.2 | 2.2 | 4.8 | 84 | 84 | 12.5 | 37.3 | 23.0 | 3.0 | 85 |
| Comparative Example 2 | Polyester 1/2/3 = 87/5/8 | 2.4 | 2.4 | 5.8 | 84 | 84 | 16.0 | 43.9 | 29.0 | 2.7 | 85 |
| Comparative Example 3 | Polyester 1/2/3 = 45/5/50 | 2.4 | 2.4 | 5.8 | 72 | 72 | 16.0 | 43.9 | 29.0 | 2.7 | 85 |
| Comparative Example 4 | Polyester 1/2/3 = 58/5/37 | 2.3 | 2.3 | 5.3 | 75 | 75 | 30.0 | 24.6 | 29.0 | 0.8 | 85 |
| Comparative Example 5 | Polyester 1/2/4 = 45/5/50 | 2.2 | 2.2 | 4.8 | 76 | 76 | 12.5 | 37.3 | 23.0 | 3.0 | 85 |
| Comparative Example 6 | Polyester 1/2/5 = 35/5/60 | 2.2 | 2.2 | 4.8 | 76 | 76 | 12.5 | 37.3 | 23.0 | 3.0 | 85 |
| Comparative Example 7 | Polyester 1/2/3/4 = 4/5/25/66 | 2.2 | 2.3 | 5.1 | 73 | 73 | 23.0 | 23.0 | 23.0 | 1.0 | 74 |

TABLE 3

| | glass transition temperature (° C.) | ratio of diethylene glycol (mol %) | intrinsic viscosity (dl/g) | shrinkage after immeresiron at 98° C. for 10 secnds (%) | shrinkage after immeresiron at 70° C. for 10 secnds after film formation (%) | shrinkage after immeresiron at 70° C. for 10 secnds after aging (%) | shrinkage after immeresiron at 70° C. for 10 secnds change rate (%) | plalar orientation degree | shrinkage stress (MPa) | tensile elongation at break before aging (%) | tensile elongation at break after aging (%) |
|---|---|---|---|---|---|---|---|---|---|---|---|
| Example 1 | 72 | 9 | 0.72 | 45 | 15 | 14.2 | 0.8 | 0.062 | 11.3 | 452 | 451 |
| Example 2 | 72 | 9 | 0.72 | 44 | 17 | 15.3 | 1.7 | 0.064 | 12.2 | 430 | 429 |
| Example 3 | 72 | 9 | 0.72 | 42 | 19 | 17.2 | 1.8 | 0.067 | 13.7 | 401 | 401 |
| Example 4 | 68 | 15 | 0.71 | 50 | 22 | 21 | 1 | 0.059 | 8.8 | 490 | 488 |
| Example 5 | 68 | 15 | 0.71 | 52 | 23 | 21.2 | 1.8 | 0.060 | 9.4 | 455 | 450 |
| Example 6 | 68 | 15 | 0.71 | 53 | 25 | 23.4 | 1.6 | 0.062 | 11.1 | 399 | 390 |
| Example 7 | 62 | 22 | 0.71 | 72 | 27 | 26.7 | 0.3 | 0.048 | 7.7 | 571 | 570 |
| Example 8 | 62 | 22 | 0.71 | 75 | 28 | 27.8 | 0.2 | 0.055 | 8.9 | 553 | 530 |
| Example 9 | 62 | 22 | 0.71 | 67 | 25 | 24.5 | 0.5 | 0.050 | 7.8 | 560 | 534 |
| Example 10 | 62 | 22 | 0.71 | 68 | 26 | 25.4 | 0.6 | 0.052 | 8.2 | 558 | 545 |
| Comparative Example 1 | 73 | 5 | 0.73 | 37 | 14 | 8.5 | 5.5 | 0.068 | 14 | 420 | 419 |
| Comparative Example 2 | 73 | 5 | 0.73 | 32 | 15 | 8.2 | 6.8 | 0.072 | 16 | 390 | 390 |
| Comparative Example 3 | 60 | 30 | 0.7 | 78 | 26 | 25.4 | 0.6 | 0.032 | 8.8 | 620 | 12 |
| Comparative Example 4 | 62 | 22 | 0.71 | 71 | 25 | 24.4 | 0.6 | 0.033 | 7 | 612 | 17 |
| Comparative Example 5 | 75 | 0 | 0.73 | 68 | 30 | 11 | 19 | 0.061 | 8.8 | 455 | 453 |
| Comparative Example 6 | 76 | 0 | 0.73 | 70 | 32 | 9 | 23 | 0.060 | 8.9 | 430 | 422 |
| Comparative Example 7 | 68 | 15 | 0.71 | 71 | 34 | 33 | 1 | 0.034 | 2.9 | 670 | 85 |

TABLE 3-continued

| | solvent | | shrinkage finishing (before aging) | | | | shrinkage finishing (before aging) | | | |
|---|---|---|---|---|---|---|---|---|---|---|
| | natural shrinkage (%) | bonding strength (N/15 mm) | shrinkage strain | shrinkage insufficiency | wrinkle | peeling off | shrinkage strain | shrinkage insufficiency | wrinkle | peeling off |
| Example 1 | 0.2 | 5.2 | ○ | ○ | ○ | ○ | ○ | ○ | ○ | ○ |
| Example 2 | 0.1 | 4.9 | ○ | ○ | ○ | ○ | ○ | ○ | ○ | ○ |
| Example 3 | 0.1 | 4.2 | ○ | ○ | ○ | ○ | ○ | ○ | ○ | ○ |
| Example 4 | 0.2 | 6.0 | ○ | ○ | ○ | ○ | ○ | ○ | ○ | ○ |
| Example 5 | 0.3 | 5.9 | ○ | ○ | ○ | ○ | ○ | ○ | ○ | ○ |
| Example 6 | 0.2 | 5.7 | ○ | ○ | ○ | ○ | ○ | ○ | ○ | ○ |
| Example 7 | 0.2 | 6.4 | ○ | ○ | ○ | ○ | ○ | ○ | ○ | ○ |
| Example 8 | 0.2 | 6.3 | ○ | ○ | ○ | ○ | ○ | ○ | ○ | ○ |
| Example 9 | 0.1 | 6.3 | ○ | ○ | ○ | ○ | ○ | ○ | ○ | ○ |
| Example 10 | 0.1 | 6.2 | ○ | ○ | ○ | ○ | ○ | ○ | ○ | ○ |
| Comparative Example 1 | 0.3 | 4.1 | X | X | X | ○ | X | X | X | ○ |
| Comparative Example 2 | 0.3 | 3.3 | X | X | X | X | X | X | X | X |
| Comparative Example 3 | 0.5 | 7.4 | ○ | ○ | ○ | ○ | ○ | ○ | ○ | ○ |
| Comparative Example 4 | 0.4 | 6.7 | ○ | ○ | ○ | ○ | ○ | ○ | ○ | ○ |
| Comparative Example 5 | 1.2 | 7.0 | ○ | ○ | ○ | ○ | X | ○ | X | ○ |
| Comparative Example 6 | 1.3 | 7.1 | ○ | ○ | ○ | ○ | X | ○ | X | ○ |
| Comparative Example 7 | 0.3 | 7.2 | ○ | ○ | ○ | ○ | ○ | ○ | ○ | ○ |

As the evaluations show, films of Examples 1 to 10 had sufficient shrinkability and low shrinkage stress, therefore the films had good shrinkage finishing. Due to the high planar orientation, the films had good, 0% of initial film rapture occurring rate after aging. The film had almost no decrease in shrinkage at 70° C. after aging, and had good shrinkage finishing property after aging.

The film of Comparative Example 1 had diethylene glycol at low ratio. The film had low amorphous and insufficient shrinkage, and therefore the film had a large change in shrinkage at 70° C. after aging. Judging from the evaluations and in Comparative Example 1, shrinkage finishing properties of the film both before and after shrinkage were poor because of the shrinkage strain and insufficient shrinkage.

The film of Comparative Example 2 had diethylene glycol at low ratio, the film has low amorphous and insufficient shrinkage. The film also had high shrinkage stress and had large change in shrinkage after aging. The film showed low solvent bonding strength, and poor shrinkage finishing properties such as shrinkage distortion and insufficient shrinkage were shown. In addition, peeling off of sealed part of the film was observed.

The films of Comparative Examples 3 and 4 had sufficient shrinkage and low shrinkage stress. However, the films had low elongation in longitudinal directions after aging due to the small degree of planar orientation. Troubles were often caused with the films while being post-processed.

The film of Comparative Example 5 was highly amorphous and had sufficient shrinkage, high degree of planar orientation and low shrinkage stress due to neopentyl glycol constituent. However, the film had diethylene glycol at low ratio, and this lead to a large change in shrinkage at 70° C. and large natural shrinkage after aging. The film showed good shrinkage finishing property before aging, but showed poor shrinkage finishing property after aging. This was due to the occurrence of shrinkage strain and wrinkles accompanying the decrease in shrinkage at 70° C.

The film of Comparative Example 6 was highly amorphous and had sufficient shrinkage, high planar orientation, and low shrinkage stress due to cyclohexanedimethanol constituent. However, the film had diethylene glycol at low ratio, and this lead to a large change in shrinkage at 70° C. and large natural shrinkage after aging. The film showed good shrinkage finishing property before aging, but showed poor shrinkage finishing property after aging. This was due to the occurrence of shrinkage strain and wrinkles accompanying the decrease in shrinkage at 70° C.

The film of Comparative Example 7 had sufficient shrinkage and low shrinkage stress, however, the elongation in a longitudinal direction was low because of the small planar orientation. Troubles were often caused with the film while being post-processed.

INDUSTRIAL APPLICABILITY

As described above, the heat-shrinkable polyester film of the present invention has sufficient shrinkability, low shrinkage stress, and good shrinkage finishing property. In addition, the film has good shrinkage finishing property after aging, this is because of the small change in shrinkage after aging. Also, the film has low initial film rapture occurring rate due to its high planar orientation, troubles such as breakage hardly occur at the time of post-processing like printing even after long-term storage. As described above, the film has excellent shrinkage finishing property and workability after manufacturing or long-term storage, and therefore, the film can be suitably used as a label for a beverage bottle or for a bento banding packaging.

The invention claimed is:

1. A heat-shrinkable polyester film comprising
   (a) 70 mol % or more of ethylene terephthalate in all the polymer constituent component constituting the film,
   (b) 6 mol % or more and 25 mol % or less of diethylene glycol based on the total polyhydric alcohol content in all the polyester resin constituting the film,
   (c) 0 mol % of polycarboxylic acids other than terephthalic acid based on the total polycarboxylic acid content in all the polyester resin constituting the film,
   (d) 0 mol % of polyhydric alcohols other than ethylene glycol and diethylene glycol based on the total polyhydric alcohol content in all the polyester resin constituting the film,
   wherein the polymer constituent component contains only polyester, and
   wherein the film satisfies the following (1) to (4):
   (1) the film has a hot-water heat shrinkage of 40% or more in a main shrinkage direction of the film when the film is immersed in hot water of 98° C. for 10 seconds;
   (2) the film has a planar orientation coefficient of 0.035 or more and 0.070 or less;
   (3) the film has a maximum shrinkage stress of 2 MPa or more and 17 MPa or less in the main shrinkage direction of the film when measured in hot air of 90° C.; and
   (4) the film has a tensile elongation at break of 20% or more in a direction orthogonal to the main shrinkage direction after the film is aged in an atmosphere with an atmospheric temperature of 40° C. and a relative humidity of 85% for 28 days.

2. The heat-shrinkable polyester film according to claim 1, wherein the film has a tensile elongation at break of 100% or more in the direction orthogonal to the main shrinkage direction after the film is aged in an atmosphere with an atmospheric temperature of 40° C. and a relative humidity of 85% for 28 days.

3. The heat-shrinkable polyester film according to claim 1, wherein the film has a difference of less than 5% between a shrinkage before and after aging in a main shrinkage direction measured under the following conditions:
   the film before aging is measured for shrinkage after the film is immersed in hot-water of 70° C. for 10 seconds; and
   the film after aging is first aged in an atmosphere with an atmospheric temperature of 30° C. and a relative humidity of 85% for 28 days and then measured for shrinkage after the aged film is immersed in hot-water of 70°° C. for 10 seconds.

4. The heat-shrinkable polyester film according to claim 1, wherein the film has a solvent bonding strength of 4 N/15 mm width or more and 15 N/15 mm width or less.

5. The heat-shrinkable polyester film according to claim 1, wherein the film has a natural shrinkage of less than 1.0% when the film is aged in an atmosphere with an atmospheric temperature of 40° C. and a relative humidity of 85% for 28 days.

6. The heat-shrinkable polyester film according to claim 1, wherein the film has an intrinsic viscosity of 0.60 dl/g or more and 0.75 dl/g or less.

7. The heat-shrinkable polyester film according to claim 1, wherein the main shrinkage direction of the film is a width direction of the film.

8. The heat-shrinkable polyester film according to claim 1, wherein the film is a uniaxially stretched film.

9. A label obtained from the heat-shrinkable polyester film according to claim 1.

10. A package formed by covering at least a part of outer periphery of an object with the label according to claim 9 followed by thermally shrinking the label.

\* \* \* \* \*